US006904439B2

(12) United States Patent
Tang et al.

(10) Patent No.: US 6,904,439 B2
(45) Date of Patent: Jun. 7, 2005

(54) SYSTEM AND METHOD FOR AGGREGATING USER PROJECT INFORMATION IN A MULTI-SERVER SYSTEM

(75) Inventors: Raymond T. Tang, Chelmsford, MA (US); William R. Rodrick, Chelmsford, MA (US); Miguel A. Estrada, Hollis, NH (US); Sami M. Shalbi, Arlington, MA (US); Charles R. Hill, Belmont, MA (US)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 10/334,261

(22) Filed: Dec. 31, 2002

(65) Prior Publication Data

US 2004/0139108 A1 Jul. 15, 2004

(51) Int. Cl.[7] .............................................. G06F 17/30
(52) U.S. Cl. ..................... 707/102; 707/100; 707/104.1
(58) Field of Search ............................. 707/100–104.1, 707/200–203; 717/140

(56) References Cited

U.S. PATENT DOCUMENTS

2002/0092004 A1 * 7/2002 Lee et al. ................... 717/140
2002/0095436 A1 * 7/2002 Lee ............................ 707/203

* cited by examiner

Primary Examiner—Charles Rones
Assistant Examiner—Neveen Abel-Jalil
(74) Attorney, Agent, or Firm—Stephen T. Keohane; Shelley M. Beckstrand

(57) ABSTRACT

A system for aggregating user information on a plurality of projects and servers includes a project catalog; a project catalog server; a plurality of project servers; a plurality of project databases; a project database being associated with each project server; an entry in the project catalog for each project server and each project database; and a my projects procedure responsive to user entry of a my projects request for accessing the project catalog server to obtain markup language representations of entries in the project catalog for the user for display at a terminal.

23 Claims, 11 Drawing Sheets

SYSTEM AND METHOD FOR AGGREGATING USER PROJECT INFORMATION IN A MULTI-SERVER SYSTEM

CROSS REFERENCES TO RELATED APPLICATIONS

Copending U.S. patent applications
Ser. No. 10/334,269 entitled "SYSTEM AND METHOD FOR THE AGGREGATION OF PLACE INFORMATION IN A MULTI-SERVER SYSTEM",
Ser. No. 10/334,296, entitled "SYSTEM AND METHOD FOR CENTRAL REFRESH OF PLACE OBJECTS"; and
Ser. No. 10/334,268 entitled "SYSTEM AND METHOD FOR SEARCHING A PLURALITY OF DATABASES DISTRIBUTED ACROSS A MULTI SERVER DOMAIN";
are assigned to the same assignee hereof and contain subject matter related, in certain respect, to the subject matter of the present application. The above identified patent applications are incorporated herein by reference.

BACKGROUND OF THE INVENTION

1. Technical Field of the Invention

This invention relates to a system and method for aggregating information descriptive of a users projects in a multi-server environment.

2. Background Art

One of the most perplexing issues for users of applications such as the IBM Lotus QuickPlace® application has been that the user must remember the exact place name and the name of the server it resides on, or else create and thereafter select a project bookmark for it from a favorites drop down list, to access the place. For example, to access a place named "haikuteam" residing on server qp.iris.com, the user has had to enter the following URL in the browser:

http:qp.iris.com/haikuteam

When the number of places a user has to remember or select from a favorites list gets into the tens or hundreds, this access become quite difficult. This also requires that the user know that he has been granted access to a place, in order to know to create the bookmark. In the past this has generally been done by an administrator or manager of the place sending a note to the user, who must then recognize that he has been granted access to a place for which he can create the bookmark.

Further, entering such places often requires that the user "sign-on", including password authentication.

Consequently, there is a need in the art for an improved and simple procedure for enabling a user to enter a place selected from many places and to do so without repeated sign on challenges.

OBJECTS AND SUMMARY OF THE INVENTION

It is therefore an object of the invention provide an improved system and method for aggregating user project information.

In accordance with a method of the invention, aggregating user information on a plurality of projects and servers includes configuring a catalog database server to a host catalog database and as accessible to a plurality of project servers; configuring each project server for accessing the catalog database server; providing for each project server and each project a separate entry in the host catalog database, including catalog database indicia describing each project server and project indicia describing each project; generating to a servers list and a projects list markup language representations from the host catalog database of entries for the specified member; generating from the servers list and the projects list a combined list in markup language representation conforming to an object model; and processing the combined list into a presentation format for display at a user terminal.

In accordance with a system of the invention, aggregating user information on a plurality of projects and servers is provided by a project catalog; a project catalog server; a plurality of project servers; a plurality of project databases; a project database being associated with each project server; an entry in the project catalog for each project server and each project database; and a my projects procedure responsive to user entry of a my projects request for accessing the project catalog server to obtain markup language representations of entries in the project catalog for the user for display at a terminal.

In accordance with an aspect of the invention, there is provided a computer program product configured to be operable to for aggregating user information on a plurality of projects and servers includes configuring a catalog database server to a host catalog database and as accessible to a plurality of project servers; configuring each project server for accessing the catalog database server; providing for each project server and each project a separate entry in the host catalog database, including catalog database indicia describing each project server and project indicia describing each project; generating to a servers list and a projects list markup language representations from the host catalog database of entries for the specified member; generating from the servers list and the projects list a combined list in markup language representation conforming to an object model; and processing the combined list into a presentation format for display at a user terminal.

Other features and advantages of this invention will become apparent from the following detailed description of the presently preferred embodiment of the invention, taken in conjunction with the accompanying drawings.

BEST MODE FOR CARRYING OUT THE INVENTION

In accordance with the preferred embodiments of the invention, access to projects (in the context of Lotus QuickPlace, to places) of which the user is a member, either explicitly or as a member of a group with membership in the project or place, is facilitated. The user is able to reduce to one the number of project bookmarks in his browser: that of the home page on the project server. From this home page, the user can initiate project sessions by signing in and accessing his projects, sorted by title (e.g., "Joe's wonderful place"). In the exemplary embodiment of QuickPlace, because QuickPlace supports multi-server "single sign-on" authentication, users can visit their QuickPlaces without further password challenges, simply by clicking on the Place title. Switching to another place then becomes a matter of clicking on a My Places link which is present in the table of contents (TOC) on most pages, unless this feature is disabled, and then clicking on the title of the place to be visited.

In accordance with the preferred embodiment of the invention, implementation of the My Places feature includes four components: (1) a place catalog, (2) place catalog configuration and operation, (3) a My Places query, and (4) a rendering of a My Places user interface.

In an exemplary embodiment of the invention, a place catalog is an IBM Lotus Domino® database used to aggregate information about all places in an enterprise. Two views defined in the catalog are a place servers view and a places by member view. The places by member view uses a Notes formula to generate a table that is indexed by the unique combination of a member name and a place name. Table entries are sorted by the member names such that places belonging to the same member are grouped together in the list sorted alphabetically.

The place catalog is configured for each server that interacts with through a configuration file (qpconfig.xml) which is formatted in XML. Table 1 is an example of such a configuration file. Table 2 presents a second example and provides for clustering, as will be described hereafter.

TABLE 1

PLACE SERVER CONFIGURATION FILE
(qpconfig.xml)

```
1    <place_catalog enabled="true" log_level="0">
2        <connection_pool size="8"/>
3        <place_catalog_servers>
4            <server>
5                <domino_server_name>qpcat/IBM</domino_server_name>
6                <nsf_filename>PlaceCatalog.nsf<nsf_filename>
7            </server>
8        </place_catalog_servers>
9    </place_catalog>
```

The setting in Table 1 that controls the place catalog is the place_catalog setting at line 1, which allows an administrator to enable or disable the use of the place catalog on this server, to specify the place catalog server name, to specify the place catalog filename, and other options as well. Specifying the place catalog server name in qpconfig.xml effectively makes all the places in this place server accessible to the My Places feature.

Figure 1:
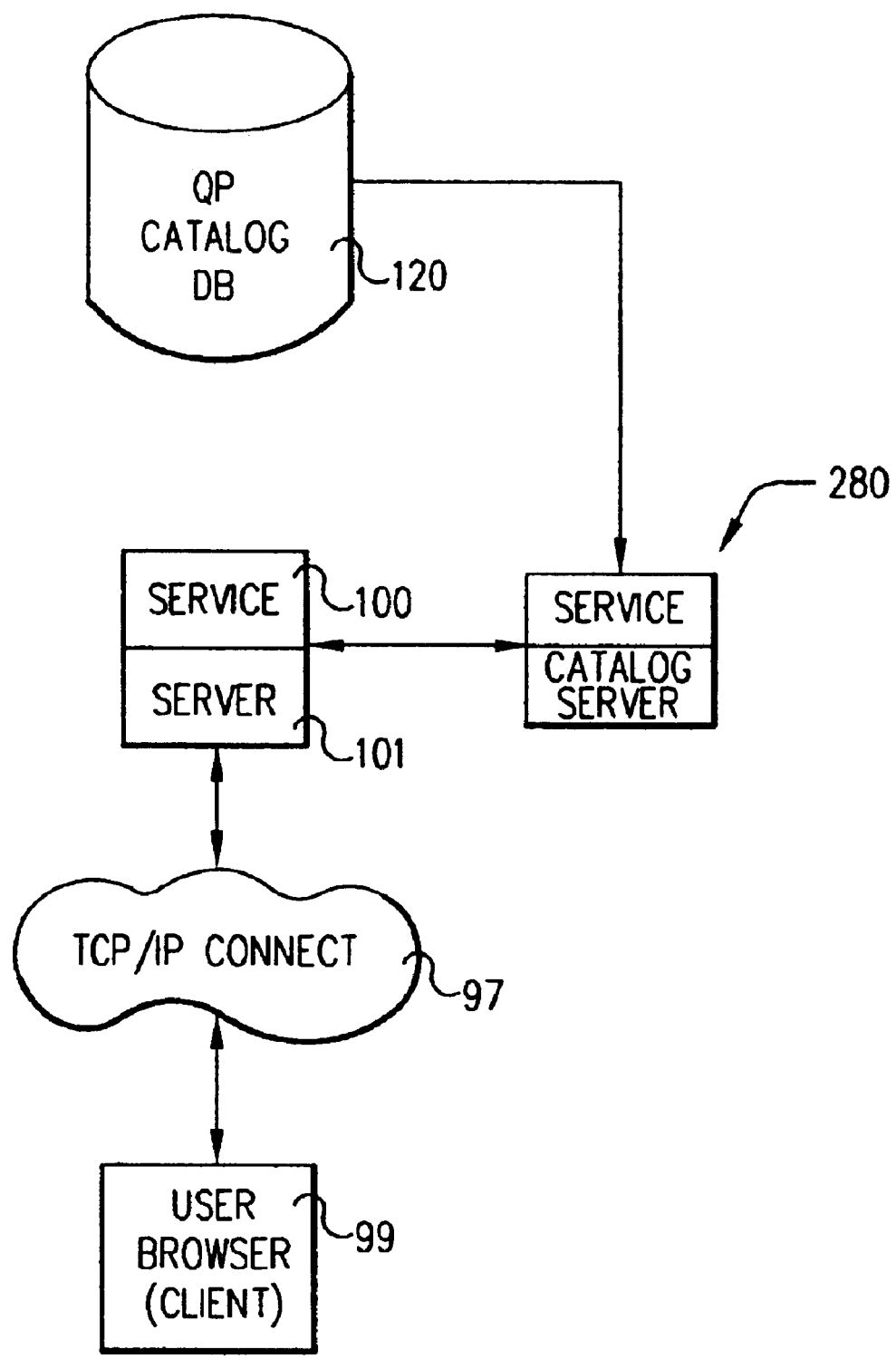
FIG. 1 is a high level system diagram illustrating a typical system configuration in accordance with the preferred embodiment of the invention.
Figure 2:
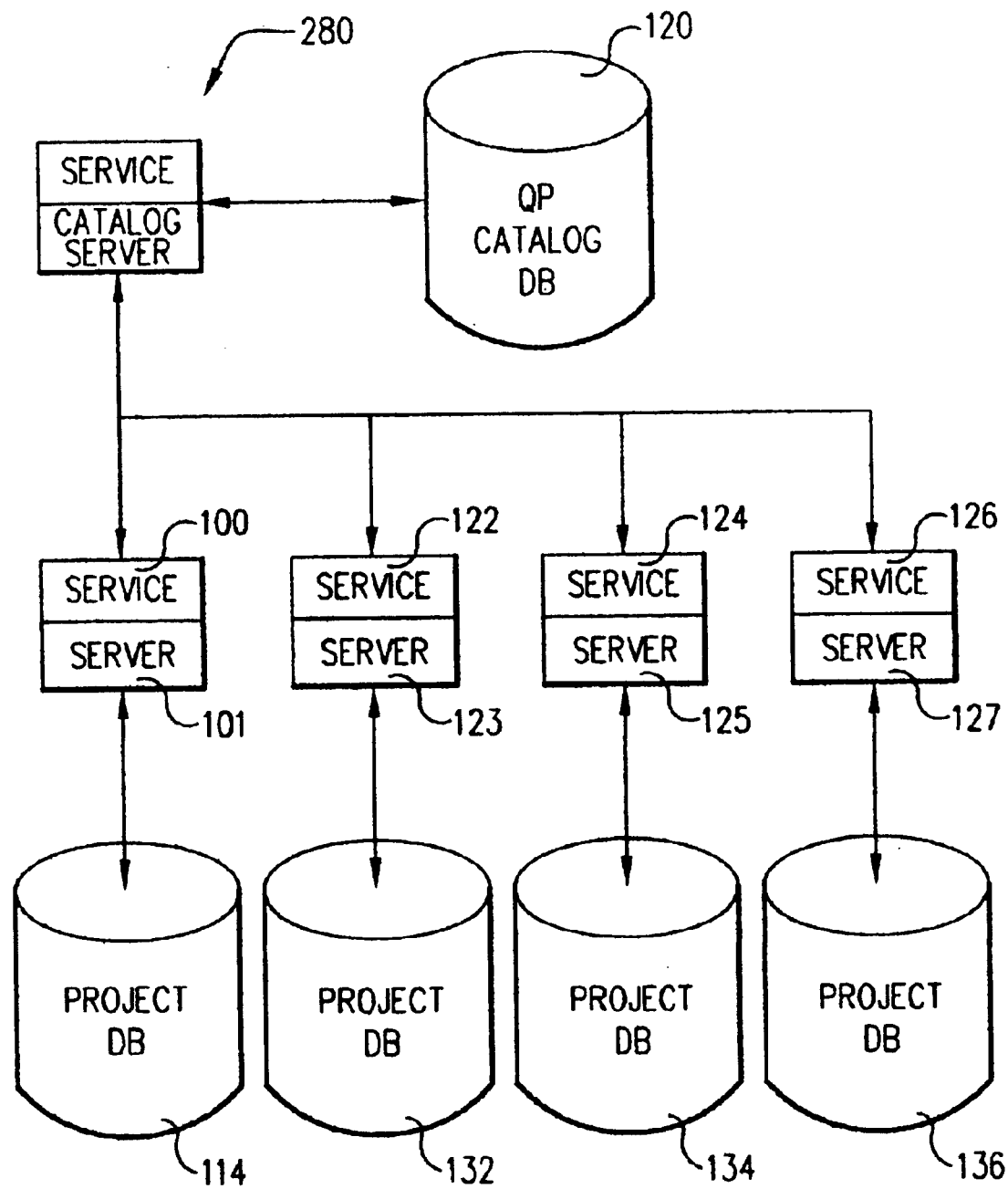
FIG. 2 is a high level system diagram illustrating a typical multi-server system environment.

Referring to FIGS. 1 and 2, catalog 120 is a database, such as a QuickPlace catalog, for aggregating information about projects, such as QuickPlaces 114, 132, 134, 136, in a multi-server system environment, including service 100/server 101, 122/123, 124/125, and 126/127, communications link 97, and one or more client terminals, such as user browsers 99. Throughout this specification, the generic term "project" and more specific terms "place" or "QuickPlace" are used substantially interchangeably. Place and QuickPlace are specific examples of projects. Similarly, "host catalog" and "QuickPlace catalog" are equivalent terms.

The functionality available to each user via remote terminals 99 may be customized in accordance with the needs and authorization of the user and/or entity. Terminals 99 may access the system using, for example, browser software technology or other electronic accessing methods as my be known to one of skill in the art. Reports and other information displayed to the end user at terminal 99 may be displayed using known web page formatting techniques.

Communication link 97 links remote terminals 99 to server 101. Link 97 may be a hardwired link, such as a telephone line, coaxial cable, digital data line, or the like, or a wireless link such as a radio frequency or infrared communications link, or the like.

As illustrated in FIG. 1, a QuickPlace service 100 represents a group a servers that are able to communicate with each other through a network, and work together to provide function (such as project creation, search across projects and servers, and get aggregate view across all servers and projects).

In a preferred embodiment, this service is implemented in an abstract sense, in that each server 100 implements a notion of service, which in this sense is a multi-server deployment of QuickPlace servers 101 that can be treated as a consistent unit of service for administration and in the user interface.

A QuickPlace service 100 comprises multiple QuickPlace servers 101 and/or QuickPlace clusters, which: (1) are in the same Domino domain; (2) share the same user directory and authentication system; (3) are on the same user network (i.e., are not separated by a firewall); and (4) are administered by the same administration team. These constraints are enough to ensure across the service that: (1) servers 101 can be configured consistently; (2) servers 101 can communicate and share data with each other; (3) user identities are in the same name space and do not collide; and (4) single sign on authentication can be implemented.

Figure 3:
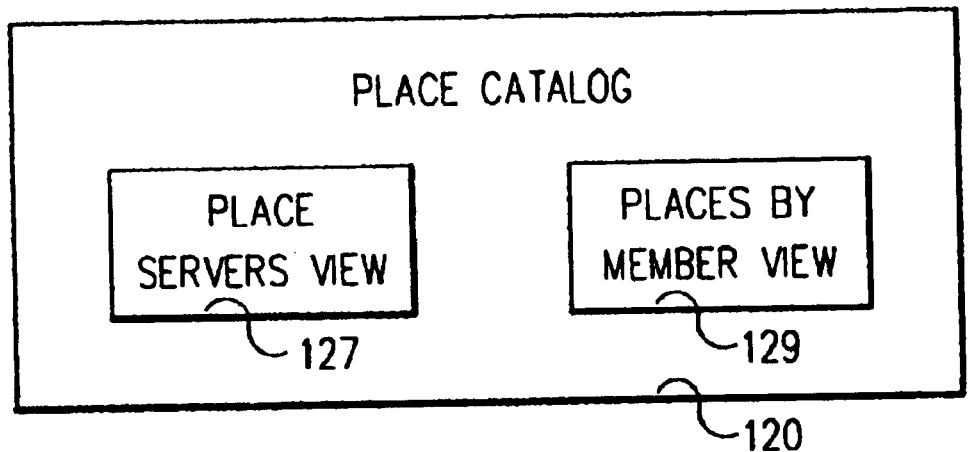
FIG. 3 is a diagram illustrating the host catalog of FIG. 1.

Referring to FIG. 3, host catalog 120 includes a place servers view 128 and a places by member view 129. Catalog 120 collects data about places and provides administrators with a central point of control across multiple QuickPlace application servers 101 and clusters. Administrators can generate reports from catalog 120 to set management policies. A My Places end-user feature also depends on catalog 120. The Host catalog has two audiences: administrators and users. Administrators can use a QPTool command line tool or an XML interface to the QuickPlace Java™ XML API to access the host catalog 120 to query information. Users access catalog indirectly, through features such as My Places, which allows them to see the places they belong to, and Search Places, which allows them to search in places across the enterprise. In an exemplary embodiment, catalog 120 is a centralized database in which to collect information about all a users QuickPlaces 114, 132 and QuickPlace servers 101, 123.

Figures 4, 5:
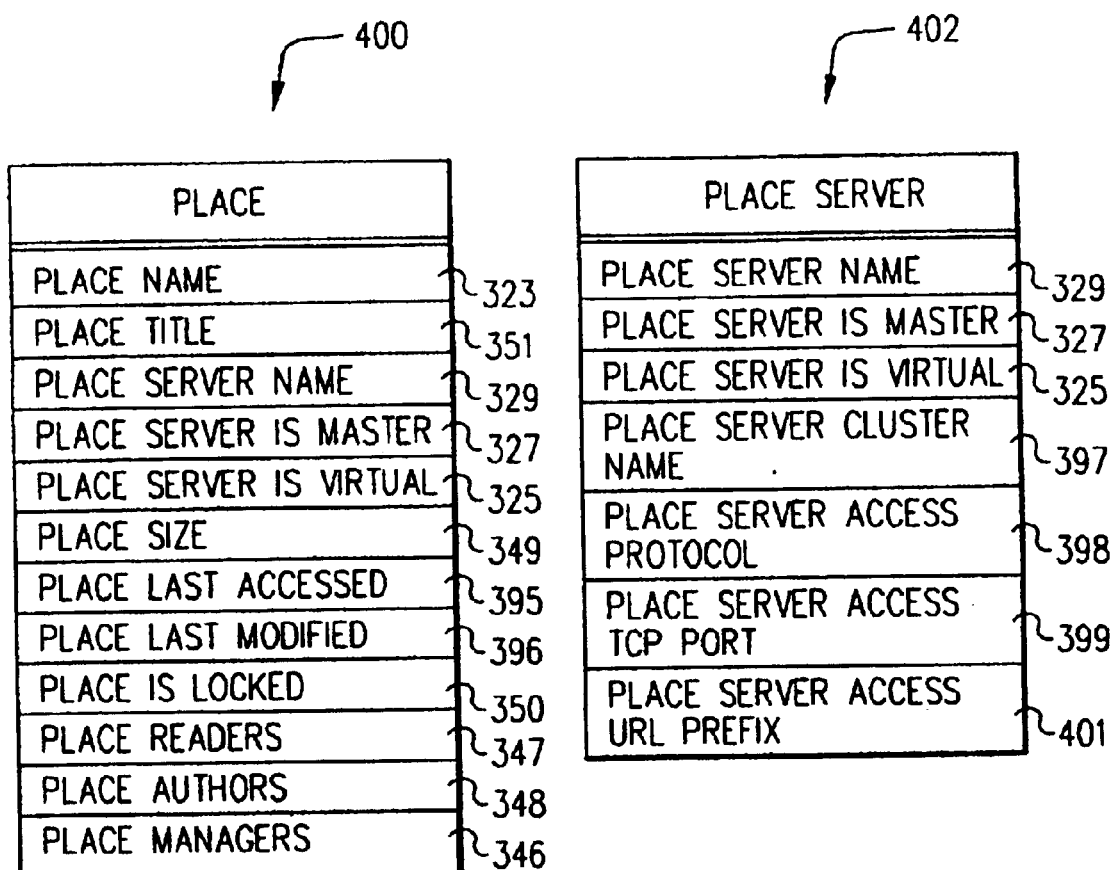
FIG. 4 is a diagrammatic illustration of the content of the places by member view of FIG. 3.
FIG. 5 is a diagrammatic illustration of the content of the place servers view of FIG. 3.

Referring to FIG. 4, information 400, 402 stored in host catalog 120 includes in place server view 128 for each QuickPlace server 101, 123, 125, 127 in the enterprise:
  PlaceServerName 329,
  PlaceServerAccessProtocol 298,
  PlaceServerAccessTCPPort 399,
  PlaceServerAccessURLPrefix 401,
  PlaceServerIsMaster 327,
  PlaceServerIsVirtual 325,
  PlaceServerClusterName 397;
and in place by member view 129 for each place 114, 132, 134, 136 in the enterprise:
  PlaceName 323,
  PlaceTitle 351,
  PlaceServerName 329,
  PlaceManagers 346,
  PlaceAuthors 348,
  PlaceReaders 347,
  PlaceSize 349,
  PlaceLastAccessed 395,
  PlaceLastModified 396,
  PlaceIsLocked 350,
  PlaceServerIsMaster 327, and
  PlaceServerIsVirtual 325.

Host catalog 120 contains data on the QuickPlace servers 101 in a service 100, the places 114 that live on those servers, and the members of those places. Each server 101 and each place 114 in the service 100 has a separate entry in catalog 120. In an exemplary embodiment, a catalog entry is implemented as a Lotus Notes® document. The enterprise administrator may decide to have one catalog 120 for the enterprise or to have several catalogs servicing separate areas of the enterprise.

Host catalog database 120 may be created using a place catalog or Notes template (.ntf file).

Figure 6:
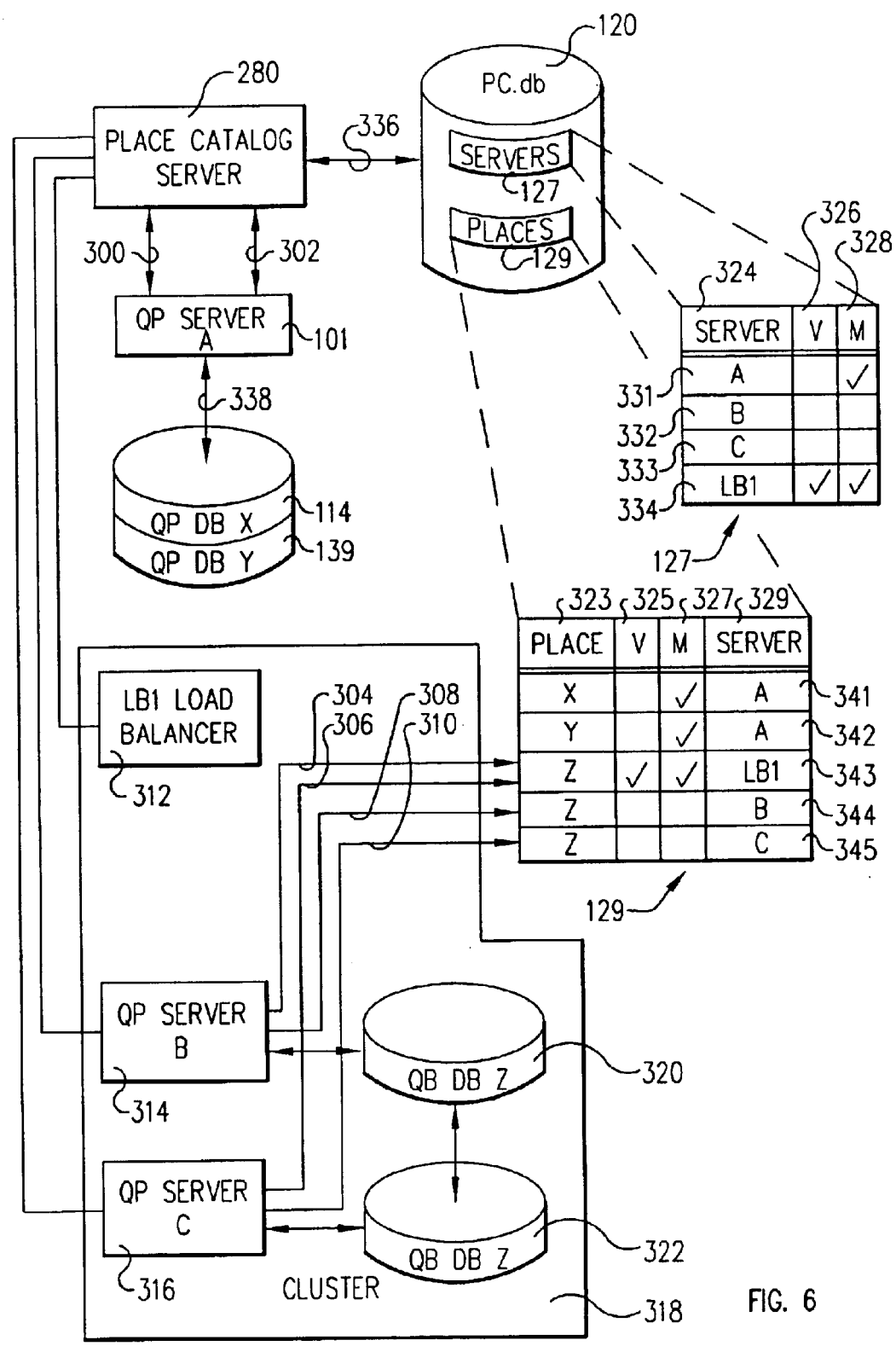
FIG. 6 is a system diagram illustrating dynamic and offline methods for aggregating information about servers and places in a multi-server environment which may include clusters.

Referring to FIG. 6, host catalog server 280 is a Domino server with QuickPlace installed which has been configured as is represented by line 336 to host catalog database 120 and which is accessible as is represented by lines 300, 302 to QuickPlace servers 101 in the enterprise through the Notes RPC (tcp port 1352) and http protocols. A typical project, or QuickPlace, cluster 318 includes a load balancer LBA server 312, a plurality of other servers 314, 136, and project databases 3120, 322. A project cluster 318 is treated as a single virtual server in the service model.

Some entries 331–334, 341–345 are created or updated in the Host catalog 120 in real time—the moment an event happens. Other entries are created or updated manually by a server task, or on a scheduled basis.

As is represented by line 300, is essential that certain data be sent in real time to avoid conflicts. For example, in a QuickPlace service 100 there cannot be two places 114, 139 with the same name. The creation of a new place 139 is an event that creates a new Catalog entry in real time. When a user creates a new place, QuickPlace server 101 first checks the Catalog 120 for that name before creating a new entry. If it finds an existing place with that name, the user is prompted to choose a different name. If the creation of a place 139 did not immediately create an entry, it would be possible for two users to successfully create two places with the same name, which would cause a conflict when QuickPlace attempted to create entries for both in the catalog 120. For this reason, it is essential that a Host catalog server 280 a QuickPlace server 101 is configured to use remains available. To increase availability of host catalog 120, the Domino clustering feature can be used to make several host catalog servers available (not shown).

Data can be updated in catalog 120 using the QPTool placecatalog-push command or on a schedule on the QuickPlace server 101.

Host catalog 120 contains information in servers view 127 about servers and in places view 129 about places. Thus, in host catalog 120, there is an entry 331 for server A 101. For simple case aggregation, or data update, projects 114, 139 are preconfigured as is represented by line 300 to point to host catalog server 280 immediately when changes occur, or as is represented by line 302 at a particular time (say, each day at 2:00 a.m.) Immediate changes may thus be made when changes occur such as place create, place remove, place lock, change access (add/remove readers, authors, managers), and change title. Scheduled updates may be made, for example, for changes such as last modified, title, size, last accessed.

Complex aggregation is required when working with clusters.

Each entry in catalog 120 has a virtual indicia entry 325, 326 and master indicia entry 328, 327. A master entry, such as entry 343, is the entry through which all access to the catalog occur for a given cluster of servers 312, 314, 316. In FIG. 6, servers A 101 and LB1 312 are master servers, and columns 327 and 328 are set for corresponding entries 331, 334, and 341–343.

A virtual server is a server that does not have project (aka, place) data, but knows how to connect place users to the project servers 314, 316 which do have place data 320, 322. Server LB1 312 is a virtual server because it does not have place data in a database. Project servers A 101, B 314, and C 316 are not virtual servers because they do have place data in databases X 114, Y 139, and Z 320, 322. Databases Z 320, 322 are clustered, so they are identical; a change to one is immediately replicated to the other.

Complex aggregation for clusters is done by sending immediate updates as are represented by lines 304 and 306 to master entries 334, 343. All other updates as are represented by lines 308 and 310 to the corresponding place entry 344, 345 for the respective servers B 314, C 316. For scheduled update, host catalog server 280 executes a process to merge entries from the virtual master LB1 312 (see entry 343, which as virtual field 235 and master field 327 set) to merge entries from the virtual master entry 343 to entries 344, 345 for other servers B 314, C 316.

The Host catalog feature is enabled by the administrator creating a host catalog database 120 and a configuration file.

The Host catalog may be created by using a PlaceCatalog.ntf template to create a Notes database. The template should be found in the Domino data directory where QuickPlace was installed. Access control on the catalog 120 is granted only to all the project servers 101, etc. and to administrators of the system.

The PlaceCatalog feature is configured for each server 101, etc. that interacts with the PlaceCatalog server 280 through a configuration file formatted as xml. That is, each quickplace server 101, etc. that wishes to operate with a PlaceCatalog 120 must have its own configuration file. The name of the file is qpconfig.xml, and is set forth in Table 2.

TABLE 2

PLACE SERVER CONFIGURATION FILE FOR CLUSTERING
(qpconfig.xml)

```
1  <?xml version="1.0" standalone="yes"?>
2  <server_settings>
3    <place_catalog_settings enabled="true">
```

TABLE 2-continued

PLACE SERVER CONFIGURATION FILE FOR CLUSTERING
(qpconfig.xml)

```
4        <log_level>4</log_level>
5        <domino_server_name>cat1/acme</domino_server_name>
6        <nsf_filename>PlaceCatalog.nsf</nsf_filename>
7      </place_catalog_settings>
8      <cluster_settings>
9        <master virtual="true">
10           <hostname>qp.acme.com</hostname>
11       </master>
12     </cluster_settings>
13   </server_settings>
```

Place_catalog_settings (Table 1, lines 3–7) contain settings related to the host catalog feature as it relates to the server associated with this configuration file. The following argument is available in this section:

enabled="true" (default)
enabled="false"

The administrator may disable and enable the PlaceCatalog operations for each QuickPlace server.

This Place_catalog_settings section (Table 2, lines 3–7) includes the following sections:

log_level
which provides the administrator with the option of logging operations related to the Host catalog in the Domino server console;

domino_server_name
which contains the name of the server hosting the host catalog in Domino format: server/organization;

nsf_filename
which is the name of the host catalog database 120 (ie PlaceCatalog.nsf).

Cluster_settings (Table 2, lines 8–12) contains settings related to the clustering feature as it relates to the server associated with this configuration file. The PlaceCatalog feature must understand the clustering configuration so it can make the proper decisions when registering places with the Host catalog. This cluster_settings section includes the following sections:

master
In QuickPlace clustering there is a concept of a "master" server 312. It specifies which server in the cluster 318 acts as the "entry point" to a quickplace 320, 322. It can be a quickplace server or it can be a network dispatcher which acts as a "virtual" server. The following argument is available in this section:

virtual="yes"
virtual="no" (default)

which specifies if the master server is a device other than a quickplace server such as a network dispatcher or local director 312. This section includes the following sections:

hostname
which specifies the hostname in tcpip format of the master server 312 in a quickplace cluster 318 (ie. qp.acme.com). This would be the host name of a network dispatcher or local director (virtual must be "yes" above) or the hostname of a quickplace server (virtual must be "no" above)

A QuickPlace server 101 may already contain existing places, such as place 114, which were created prior to configuring host catalog 120 or which were added there from a different server. In this case, the host catalog 120 must be told of the existence of these other places. This is done by using a qptool utility function "register". By default, the register function will register the place with the server that hosts it and also with the PlaceCatalog if one is configured.

Since catalog 120 must uniquely identify a place by its name, no two different places can have the same name. This must be accommodated when upgrading an existing quickplace installation where two different places can have the same name on two different servers. In this case the administrator must first resolve the conflict by unregistering one of the places, renaming its directory and then registering the place with the new name.

Each time a place is created, it is registered in real-time with Host catalog server 200. This means that PlaceCatalog is configured on a QuickPlace server, then the Host catalog server must be operational for users to be able to create places.

Everytime a place is deleted, it is un-registered in real-time with host catalog server 280.

When a QuickPlace manager adds, removes or changes a member's access level, an update is done to the Host catalog 120.

Host catalog 120 may be queried to retrieve a list of places in which a user, or one of the groups of which the user is a member, is a member.

When a user performs a search scoped to a number of quickplaces on one or more servers, the system uses a search domain server to perform the search and it also uses the Host catalog server to properly construct the URLs to the places found in the search request. For this reason, the search domain server must be configured to recognize the Host catalog server 280.

Last accessed 395 updates may be made in real time (every 1 minute) to the Host catalog 120.

Certain information maintained in host catalog 120 may not updated in real-time. Examples include place size 349 and the last time it was accessed 395 or modified 396. This information must be updated in batch mode. This is accomplished by running a qptool utility function "UpdatePlaceCatalog" on, for example, a daily basis. This can be automated as a Domino program entry similar to the QuickPlaceNightly tool.

When using quickplace clusters 318, the host catalog 120 data is maintained for each node 312. 314, 316 in the cluster as well as for a virtual place representing the combination of all nodes if and only if a network dispatcher or local director has been configured and the proper settings reflect it in the qpconfig.xml configuration file. In this case, real-time updates to the catalog are done to the virtual place entry 343 and the non-real time updates are done to each of the cluster node entries 344, 345. This allows the administrator flexibility in knowing differences in access and size for each of the nodes in the cluster.

The last accessed time 395 updates may present a problem in large installations. For this reason, a replica of the Host catalog 120 may be created for each quickplace server. This replica should use a replication formula so that only those entries that match the quickplace server are replicated. This saves space and time as each QuickPlace server will have a copy with only the entries for places that it contains. In this case, the last accessed updates occur on the local replica of the PlaceCatalog and the Domino replication schedule dictates when they are made to the central Host catalog 120.

There are two QuickPlace server cluster environment alternatives for storing QuickPlace server cluster data in Host catalog 120.

1. If the cluster 318 does not have a virtual server 312, data is maintained in separate entries in the Host catalog 120 for each physical server 314, 316, and for each place 320, 322 on a physical server.

2. If the cluster 318 has a virtual server 312, each physical server 314, 316 and place 320, 322 has an entry 344, 345, respectively. But there is also an entry 343 for the virtual server 312 that represents the combination of all physical servers. And there is an entry for each place in the cluster that represents all the replicas of the place in the cluster. When the cluster has a virtual server 312, real-time updates to the Host catalog 120 (such as place creation, locking of a place, and place membership changes) are made in the place entries 334, 343 corresponding to the virtual server. The non-real time updates (such as place size, time last accessed, and time last modified) are made to the place entries 344, 345 corresponding to the physical servers 314, 316 in the cluster. This information allows the administrator to know the differences in access 399 and size 349 for the places 320, 322 in each of the physical servers 314, 316 in the cluster 318.

A QPTool placecatalog command with the -update flag set synchronizes the place entries 344, 345 that correspond to the physical servers 314, 316, and the place entries 343 that correspond to the virtual server 312.

To set up a virtual server 312 for a QuickPlace cluster 318, a network dispatcher is configured, such as IBM Network Dispatcher Version 3.6, with proper settings configured in the QPCONFIG.XML file (Table 1) on each server 312, 314, 316 in the cluster 318.

My Places Operation

Figure 9:
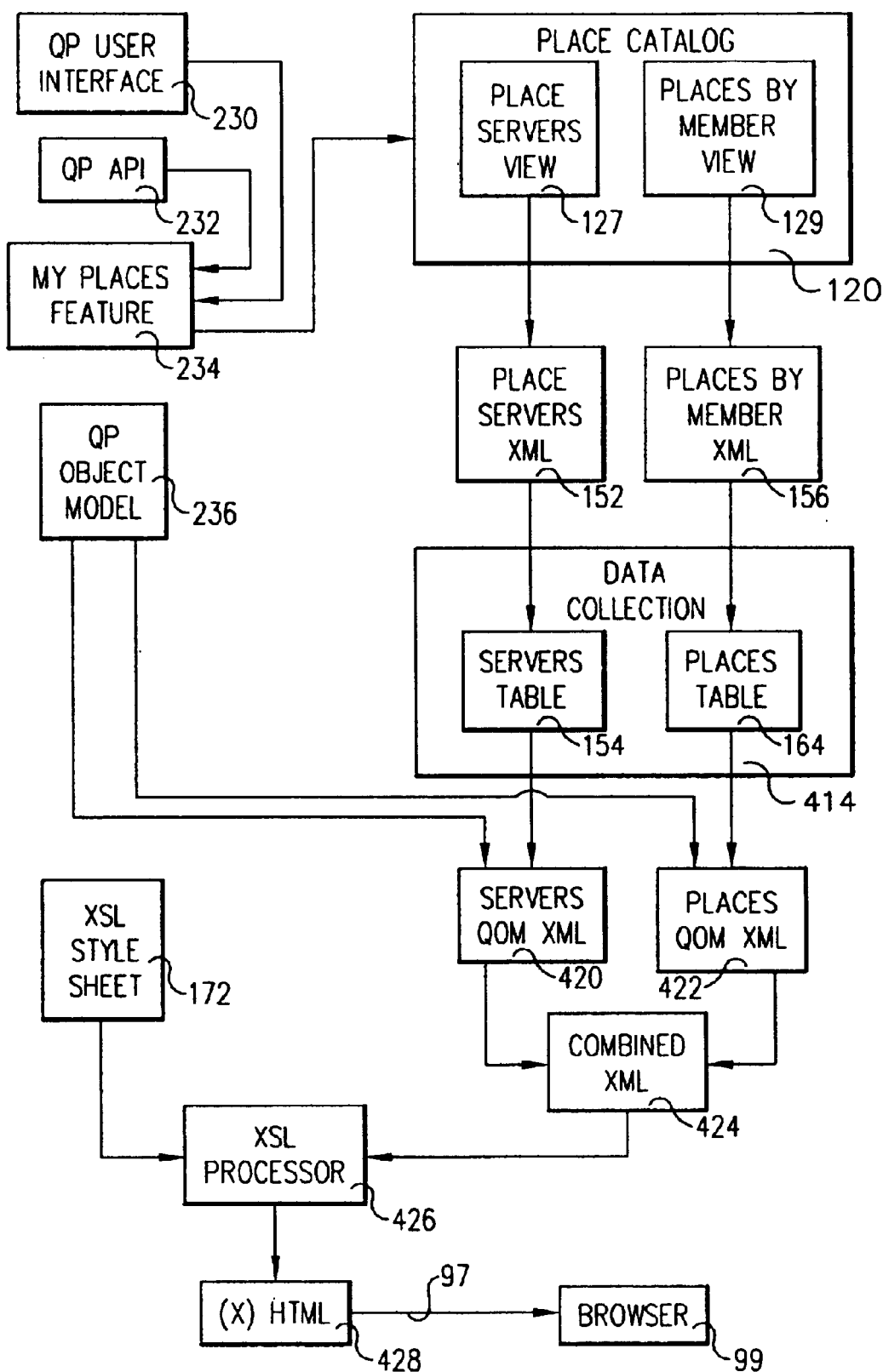
FIG. 9 is a schematic diagram illustrating system of a preferred embodiment of the invention.
Figure 10A:
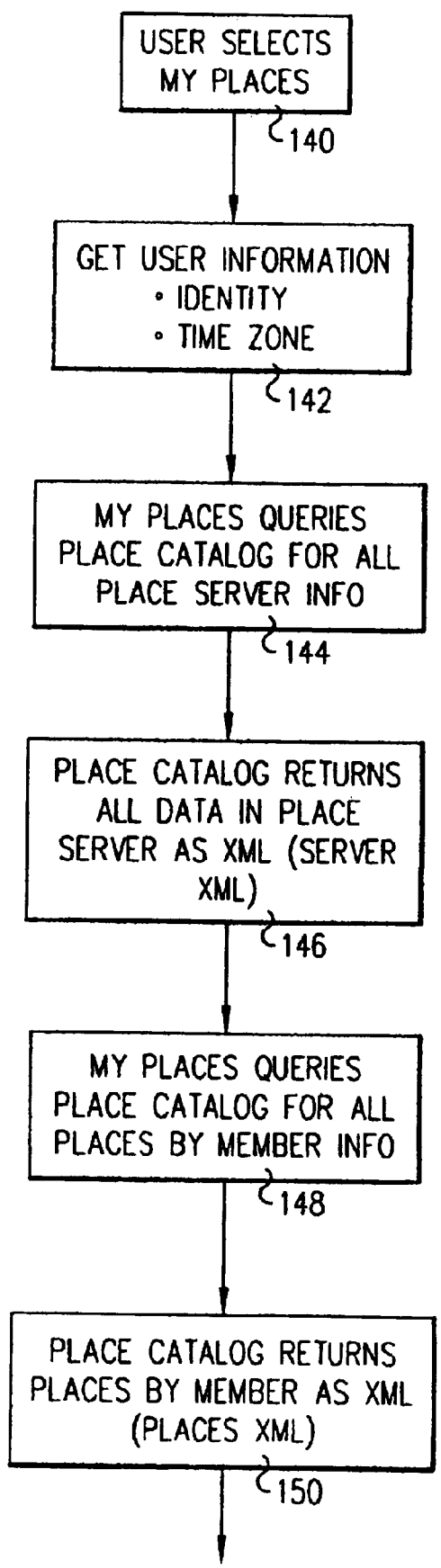
FIGS. 10A–C are a flow chart representation of an exemplary embodiment of the method of the invention for gathering and displaying to a user all Places for which he has authorization.
Figure 10B:
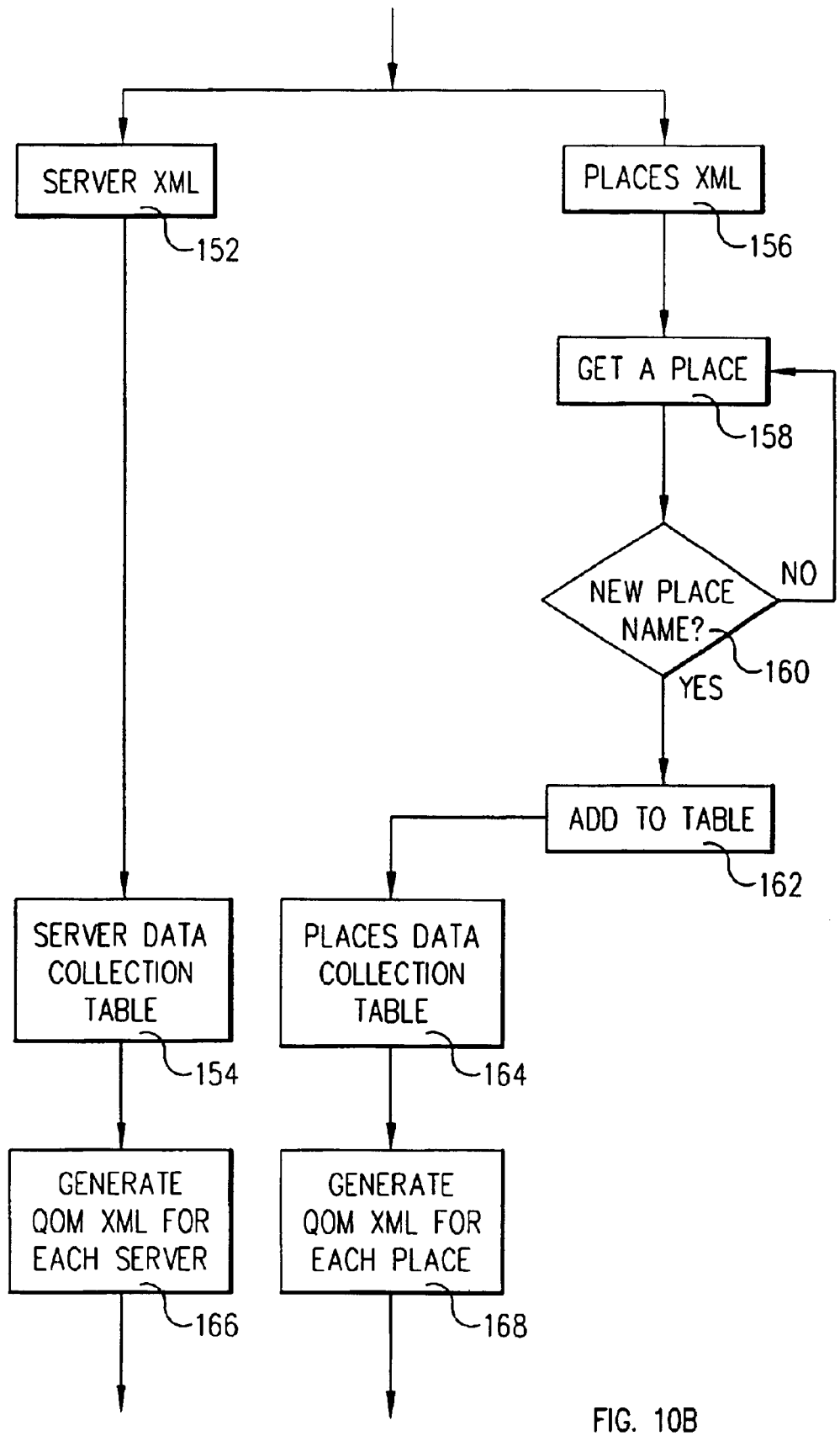
Figure 10C:
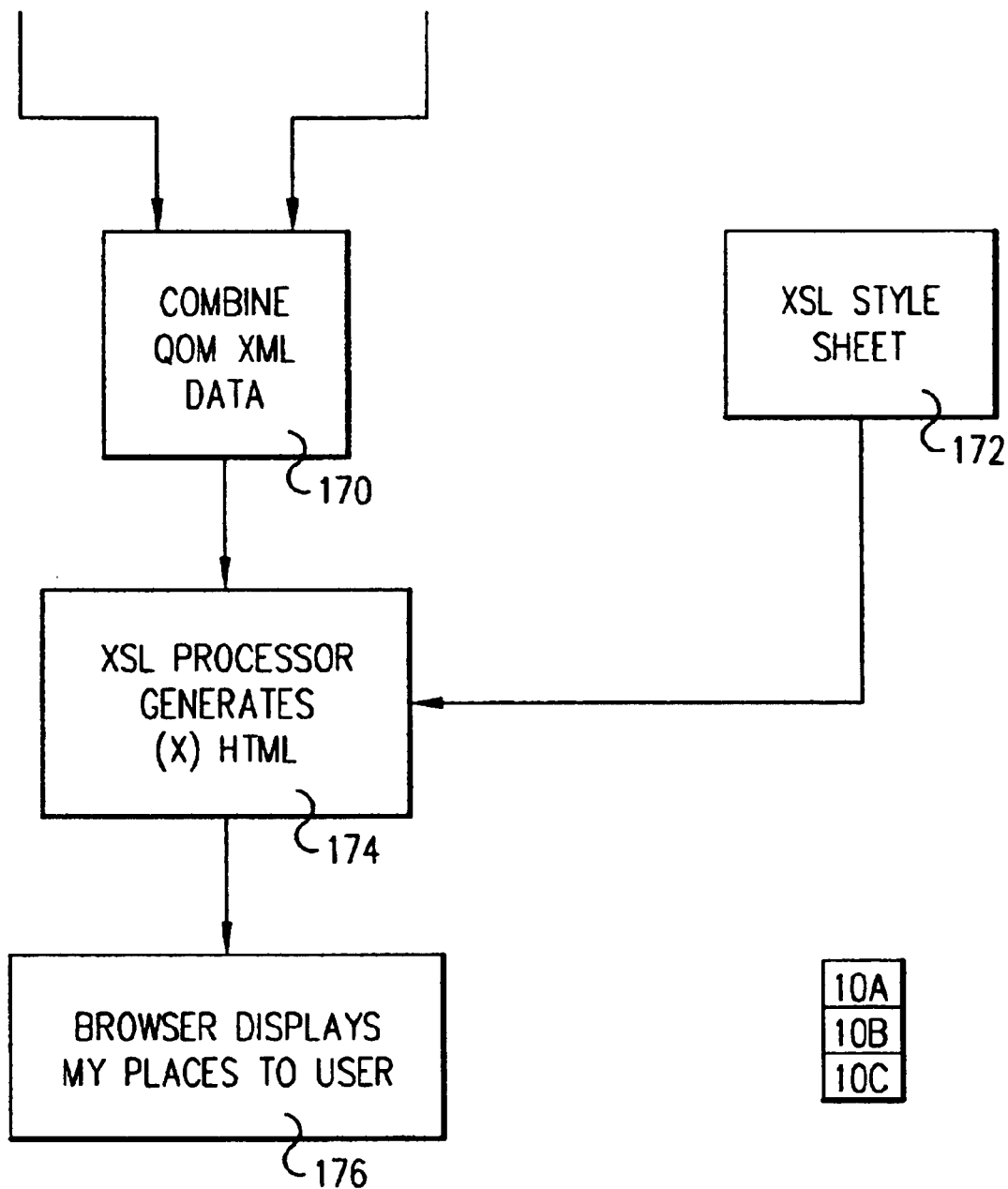

Referring to FIGS. 10A–C in connection with FIG. 9, in step 140 My Places feature 234 can be invoked through a My Places link 230 in a QuickPlace user interface, or a My Places query 232 of the QuickPlace application programming interface (API). In step 142 the user identity and time zone is determined. In steps 144 and 148, My Places feature 234 access place catalog 120 which includes place servers view 127 and places by member view 129. In step 146, place catalog 120 returns from place servers view 127 place servers XML 152 which in step 154 is stored in data collection 414 servers table 154. In step 150, place catalog 120 returns from places by members view 129 places by member XML 156 which in step 164 is stored in data collection 414 places table 164. Steps 158 get a place, 160 test for new name, and step 162 add to table are executed to eliminate duplicate places XML from being added in step 162 to table 414. In steps 166 and 168, QP object model 236 is applied to XML data collected in data collection tables 414 to generate servers QOM XML 420 and places QOM XML 422, which in step 170 are combined into combined XML 424 which is fed to XSL processor along with XSL style sheet 238 to generate in step 174 (X)HTML 428 which is fed in step 176 on communication link 97 for display in step 176 to the user at browser 99.

Figure 7:
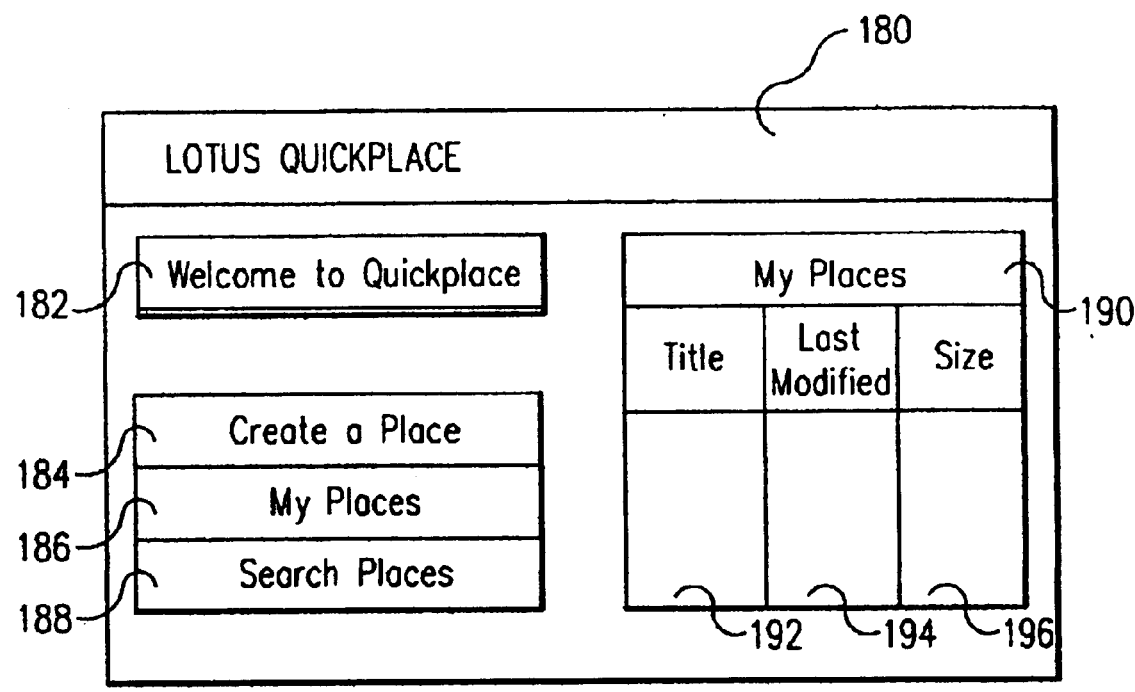
FIG. 7 is a diagrammatic view illustrating QuickPlace welcome page with "My Places".

Referring to FIG. 7, a QuickPlace serve home page 180 includes a welcome banner 182, selection buttons for actions including create a place 184, My Places 186, and search places 180. Initially, data area 190–196 contains home page material, but upon user selection pf My Places 186 is refreshed to display a list of the user's places by title 192, together with descriptive information such as last modified 194, and size 196.

Figure 8:
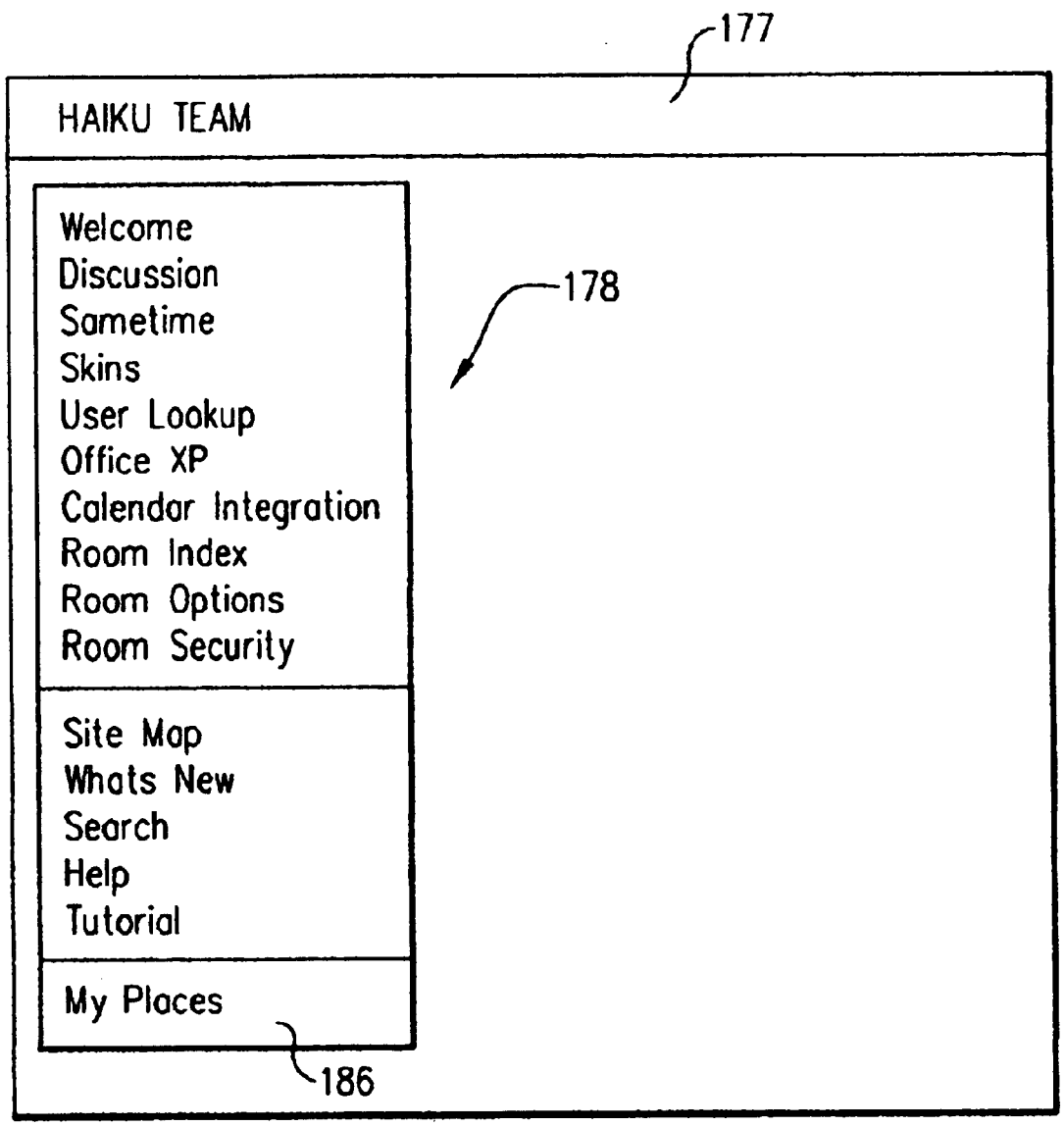
FIG. 8 is a diagrammatic view illustrating a Place page with "My Places".

Referring to FIG. 8, a place display window 177 includes a table of contents (TOC) sidebar 178 in which appears a My Places button 186, selection of which results in display of a data area substantially the same as that of FIG. 7.

Thus, finding places is made easy by presenting to each user a personalized listing of the places 114, 132, 134, 136 that he or she has access to across multiple place servers 101, 123, 125, 127. This feature also encourages users to return to the home site 180 that provides the place service, thereby increasing the likelihood of continued use of the site.

In accordance with an exemplary embodiment of the invention, as implemented in a QuickPlace environment, a My Places link is included in all built-in QuickPlace skins. When a user clicks on the My Places link, a URL for the My Places command is generated in QuickPlace client code running in browser 99. By default this is the URL of a My Places 234 page, but may be configured to specify the URL of, for example, a servlet that implements the My Places feature by means of a QuickPlace API. This URL is specified in qpconfig.xml in a my_places section, as illustrated in Table 3.

TABLE 3

MY PLACES CONFIGURATION
(qpconfig.xml)

| | |
|---|---|
| 1 | <my_places> |
| 2 |   <place_ui enabled="true"> |
| 3 |     <url>https://myserver.fred.com/servlet/myplaces</url> |
| 4 |   </place_ui> |
| 5 | </my_places> |

A default My Places 234 link may be implemented as a skin component with no formatting parameters. This skin component request includes information about the user's identity and time zone. It instantiates a QPService object (one of the objects in the QOM, or QuickPlace Object Model 236), and calls a method in that object to get a QOM XML representation of all the places listed in the place catalog of which the user is a member, either explicitly or implicitly, through group membership.

Through this method, the QPService object makes two queries 144, 148 to the place catalog. The first query 144 is for all the place servers represented in the place catalog. This query returns the data in the place servers view 127, as XML 152 formatted according to a Domino ReadViewEntries DTD. The second query 148 is for all the places of which the user is a member. If the user can be represented by more than one name, the query checks the places for all user's aliases. The query reads the PlacesByMember view 129 from place catalog 120, searches through the returned list for each alias of the user, and returns in step 150 all the places and their associated data in XML format.

This view XML 152, 156 for both servers and places is then parsed, and the data extracted is stored into separate collection (QPCollection) 414 objects 154, 164, with one entry per server and one per place, respectively. The XML may contain duplicate entries for a place, since one or more of the groups that the user belongs to may also be members of that place. In the process of storing the data in the QPCollection object for places in step 162, duplicate entries are eliminated are eliminated in steps 158, 160.

Next, in step 170 the data from the original View XML is combined and translated into a new XML document 424 that is formatted according to the standard QuickPlace DTDs defined by the QOM 236. The QP DTDs are set forth in Table 5. The DTD requires all place entries to appear under the server entry for the server on which the place exists, as in the incomplete example of Table 4.

TABLE 4

EXAMPLE XML DOCUMENT

| | |
|---|---|
| 1 | <servers> |
| 2 |   <server> |
| 3 |     <name>myServer</name> |
| 4 |     <hostname>myServer.fred.com</hostname> |
| 5 |     <places> |
| 6 |       <place> |
| 7 |         <name>mwpl1</name> |
| 8 |         <title>My Wonderful Place #1</title> |
| 9 |       </place> |
| 10 |       <place> |
| 11 |         <name>mwpl2</name> |
| 12 |         <title>My Wonderful Place #2</title> |
| 13 |       </place> |
| 14 |       <place> |
| 15 |         <name>mwpl3</name> |
| 16 |         <title>My Wonderful Place #3</title> |
| 17 |       </place> |
| 18 |     </places> |
| 19 |   </server> |
| 20 | </servers> |

TABLE 5

DOCUMENT TYPE DEFINITION (DTD)

| | |
|---|---|
| 1 | <?xml version="1.0" encoding="UTF-8"?> |
| 2 | <!ELEMENT service (servers?)*> |
| 3 | <!ELEMENT servers (server*)*> |
| 4 | <!ELEMENT server (name? \| hostname? \| port? \| protocol? \| |
| 5 | path_prefix? \| placetypes? \| places?)*> |
| 6 | <!ATTLIST server |
| 7 |     id ID #IMPLIED |
| 8 |     local (false \| true) #IMPLIED |
| 9 |     action CDATA #IMPLIED |
| 10 | > |
| 11 | <!ELEMENT placetypes (placetype*)*> |
| 12 | <!ELEMENT placetype (((name? \| description? \| |
| 13 | additional_information_url?)* \| link))> |
| 14 | <!ATTLIST placetype |
| 15 |     id ID #IMPLIED |
| 16 |     action CDATA #IMPLIED |
| 17 | > |
| 18 | <!ELEMENT places (place*)*> |
| 19 | <!ELEMENT place (name? \| placetype? \| title? \| members? \| |
| 20 | rooms? \| archive_directory? \| lock_message? \| last_accessed? |
| 21 | \| last_modified? \| size? \| meta_data?)*> |
| 22 | <!ATTLIST place |
| 23 |     id ID #IMPLIED |
| 24 |     locked (false \| true) #IMPLIED |
| 25 |     action CDATA #IMPLIED |
| 26 | > |
| 27 | <!ELEMENT person (((dn?)* \| (username? \| password? \| email? |
| 28 | \| first_name? \| last_name?)*) \| description? \| |
| 29 | offline_password? \| theme?)*> |
| 30 | <!ATTLIST person |
| 31 |     id ID #IMPLIED |
| 32 |     local (false \| true) #IMPLIED |
| 33 |     action CDATA #IMPLIED |
| 34 |     subscribed_to_newsletter (true \| false) #IMPLIED |
| 35 |     using_accessible_ui (false \| true) #IMPLIED |
| 36 |     subscribed_to_calendar_events (true \| false) #IMPLIED |
| 37 |     email_client (notes5 \| notes6 \| outlook \| ical \| other) |
| 38 | #IMPLIED |
| 39 | > |
| 40 | <!ELEMENT group (((dn?)* \| (username?)* \| username?) \| |
| 41 | description?)*> |
| 42 | <!ATTLIST group |
| 43 |     id ID #IMPLIED |
| 44 |     local (false \| true) #IMPLIED |
| 45 |     action CDATA #IMPLIED |
| 46 | > |
| 47 | <!ELEMENT rooms (room*)*> |

TABLE 5-continued

DOCUMENT TYPE DEFINITION (DTD)

| | |
|---|---|
| 48 | <!ELEMENT room (name? \| access?)*> |
| 49 | <!ATTLIST room |
| 50 |     id ID #IMPLIED |
| 51 |     action CDATA #IMPLIED |
| 52 | > |
| 53 | <!ELEMENT access (managers? \| authors? \| readers?)*> |
| 54 | <!ELEMENT managers (member*)*> |
| 55 | <!ELEMENT readers (member*)*> |
| 56 | <!ELEMENT authors (member*)*> |
| 57 | <!ELEMENT members (person* \| group*)*> |
| 58 | <!ELEMENT member (link?)*> |
| 59 | <!ATTLIST member |
| 60 |     action CDATA #IMPLIED |
| 61 | > |
| 62 | <!ELEMENT meta_data ANY> |
| 63 | <!ATTLIST meta_data |
| 64 |     action CDATA #IMPLIED |
| 65 | > |
| 66 | <!ATTLIST link |
| 67 |     idref IDREF #REQUIRED |
| 68 | > |
| 69 | <!ELEMENT protocol (#PCDATA)> |
| 70 | <!ELEMENT path_prefix (#PCDATA)> |
| 71 | <!ELEMENT port (#PCDATA)> |
| 72 | <!ELEMENT hostname (#PCDATA)> |
| 73 | <!ELEMENT name (#PCDATA)> |
| 74 | <!ELEMENT password (#PCDATA)> |
| 75 | <!ELEMENT archive_directory (#PCDATA)> |
| 76 | <!ELEMENT offline_password (#PCDATA)> |
| 77 | <!ELEMENT title (#PCDATA)> |
| 78 | <!ELEMENT theme (#PCDATA)> |
| 79 | <!ELEMENT username (#PCDATA)> |
| 80 | <!ELEMENT description (#PCDATA)> |
| 81 | <!ELEMENT additional_information_url (#PCDATA)> |
| 82 | <!ELEMENT dn (#PCDATA)> |
| 83 | <!ELEMENT email (#PCDATA)> |
| 84 | <!ELEMENT size (#PCDATA)> |
| 85 | <!ELEMENT lock_message (#PCDATA)> |
| 86 | <!ELEMENT first_name (#PCDATA)> |
| 87 | <!ELEMENT last_name (#PCDATA)> |
| 88 | <!ELEMENT last_accessed (#PCDATA)> |
| 89 | <!ELEMENT last_modified (#PCDATA)> |
| 90 | <!ELEMENT link EMPTY> |

In Table 5, character set is "UTF-8", dn represents distinguished name, ui is user interface, CDATA is any character(s), ID is an identifier which is unique in the entire file, # implied means optional, # required means required, | represents OR, ? represents an optional attribute (only one or more), * represents more than one or 0, and + represents one or more. The Element server at lines 6–9 can have any of elements name, host name . . . , and may have attributes ID (unique) local (true or false boolean), and action (anything).

The associations between places and servers are then found in the data contained in the server and place data collections, and from this, the XML is generated. A special feature of this XML generation is that it is accomplished not by simply parsing the data again and assembling an XML string by hand; rather, the data is used to populate standard QOM objects QPServer and QPPlace, and those objects then generate the XML for each server and place, via their respective "toXML" methods. The resulting XML for each object is then combined into the final document, suitable for parsing by XSL.

The final step in the rendering of My Places is accomplished by the XSL processor, which takes as its input the XML described above and an XSL stylesheet called MyQuickPlaces.xsl. This stylesheet contains the XSL templates necessary to transform standard QOM server/place XML into XHTML, which is then serialized and rendered in the browser.

The My Places feature can also be invoked through the QuickPlace API 232, an example of which is illustrated in Table 6.

TABLE 6

QUICKPLACE API EXAMPLE

```
1   <service action="query">
2     <query type="get_member_places">
3       <members>
4         <person>
5           <dn>
6             CN=Bill Rodrick,O=haiku
7           </dn>
8         </person>
9       </members>
10    </query>
11  </service>
```

Table 7 describes in pseudo code the process in steps 166, 168 by which place catalog 120 XML 152, 156 is collected, converted to QOM XML 420 and 422, and rendered for display at browser 99.

TABLE 7

CONVERSION OF CATALOG XML TO QOM XML

```
1   for (each place entry in the Place Catalog XML) {
2     if (this is not a duplicate entry)
3       store the place data in a Collection object
4   }
5   Instantiate one QPServer QOM object.
6   Instantiate a QPMap object that will map each server name to
7   its XML respresentation
8   for (each object in the Server data collection) {
9     Populate the QPServer object with this data
10    Using QPServer.toXML( ), generates a <server> XML
11    element according to the QOM DTD, containing the data
12    for this Server.
13    Insert this XML element into a QPMap object that maps
14    the server name to its XML respresentation
15  }
16  Instantiate one QPPlace QOM object
17  Instantiate a QPMap object that will map each server name to
18  its <places> XML element.
19  for (each server)
20    Create an empty <places> element in this QPMap.
21  for (each object in the Place data collection) {
22    Populate the QPPlace object with this data.
23    Using QPPlace.toXML( ), generates a <place> XML element
24    according to the QOM DTD, containing the data for this
25    place.
26    Append this <place> element to the <places> node for
27    the server where this place resides.
28  }
29  Create an empty <servers> XML element.
30  for (each server)
31    Append the appropriate <places> XML element to its
32    <server> XML element.
33  Append all completed <server> XML elements to the <servers>
34  XML element.
35  Append the completed <servers> XML element to the XML
36  document being generated by the QuickPlace Java Server.
37  Call the XSL Processor to transform the <servers> XML into
38  XHTML (i.e., "well-formed" HTML), using an XSL stylesheet
39  defining the My Places UI (this XSL is part of the My Places
40  "Skin Component").
41  Render the HTML in the user's browser.
```

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like, pursuant to one or more, or a part of one or more, program elements, modules or objects generated from any programming language, such as C++, Java, P1/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A program storage device readable by a machine, tangibly embodying a program of instructions executable by a machine to perform method steps for aggregating user information on a plurality of projects and servers, said method comprising:

configuring a catalog database server to a host catalog database and as accessible to a plurality of project servers;

configuring each said server for accessing said catalog database server;

providing for each said project server and each said project a separate entry in said host catalog database including catalog database indicia describing each said project server and project indicia describing each said project;

generating to a servers list and a projects list markup language representations from said host catalog database of entries for said specified member;

generating from said servers list and said projects list a combined list in markup language representation conforming to an object model; and processing said combined list into a presentation format for display at a user terminal.

2. A computer program product for aggregating user information on a plurality of projects and servers according to the method comprising:

configuring a catalog database server to a host catalog database and as accessible to a plurality of project servers;

configuring each said server for accessing said catalog database server;

providing for each said project server and each said project a separate entry in said host catalog database including catalog database indicia describing each said project server and project indicia describing each said project;

generating to a servers list and a projects list markup language representations from said host catalog database of entries for said specified member;

generating from said servers list and said projects list a combined list in markup language representation conforming to an object model; and processing said combined list into a presentation format for display at a user terminal.

3. A system for aggregating user information on a plurality of projects and servers, comprising:
  a project catalog;
  a project catalog server;
  a plurality of project servers;
  a plurality of project databases;
  a project database associated with each said project server;
  an entry in said project catalog for each said project server and each said project database; and
  said project server including a my projects procedure responsive to user entry of a my projects request for accessing said project catalog server to obtain markup language representations of entries in said project catalog for said user for display at a user terminal.

4. The system of claim 3, further comprising:
  a data collection database for storing said markup language representations of entries in said project catalog for said user in a first list of projects and a second list of servers;
  said project server further for converting said markup language representations in said first and second lists into a combined list of markup language representations in accordance a project object model;
  a style sheet; and
  a processor for generating from said combined list and said style sheet a representation of said combined list for display at said user terminal.

5. The system of claim 3, further comprising:
  a cluster comprising a master server and a plurality of said project servers;
  said host catalog server for executing simple aggregation on behalf of a project server which is a master non-virtual server selectively by immediate updating and scheduled updating of an entry in said catalog for said project server; and
  said host catalog server for executing complex aggregation on behalf of said cluster of servers by executing immediate updates to a master entry in said host catalog database and by executing non-immediate updates to an entry in said host catalog database for a non-virtual, non-master project server.

6. The system of claim 5, further comprising:
  said host catalog server, for scheduled update complex aggregation, for merging entries in said host catalog database from virtual master entries for a cluster to entries for project servers in said cluster.

7. The system of claim 5, each said catalog entry comprising a Notes document.

8. The system of claim 5, said host catalog database being a plurality of catalog databases servicing separate areas of an enterprise.

9. A method for aggregating user place information from a plurality of servers and projects into a single display, comprising:
  for each place entry in a place catalog XML which is not a duplicate entry, storing place data in a place collection object;
  instantiating a QPServer object;
  instantiating a QPMap object that will map each server name to its XML representation;
  for each object in a server data collection of said place catalog,
    populating said the QPServer object with said server data including server name;
    generating a <server> XML element according to a QOM DTD, containing said server data; and
    inserting said <server> XML element into a QPMap object that maps said server name to its XML representation;
  instantiating a QPPlace QOM object;
  instantiating a QPMap object that will map each server name to its <places>XML element;
  for each said server,
    creating an empty <places> element in said QPMap;
  for each object in said place collection object,
    populating said QPPlace object with said place data;
    generating a <place> XML element according to said QOM DTD, containing data for this place; and
    appending said <place> XML element to a <places> node for a server where said place resides;
  creating an empty <servers> XML element;
  for each said server, appending an appropriate <places> XML element to its <server> XML element;
  appending all completed <server> XML elements to said <servers> XML element; and
  appending a completed <servers> XML element to an XML document.

10. The method of claim 9, further comprising:
  transforming said <servers> XML into XHTML using an XSL style sheet defining a user interface for said single display; and
  rendering said XHTML in a user's browser.

11. A method for aggregating user information on a plurality of projects and servers, comprising:
  configuring a catalog database server to a host catalog database and as accessible to a plurality of project servers;
  configuring each said server for accessing said catalog database server;
  providing for each said project server and each said project a separate entry in said host catalog database including catalog database indicia describing each said project server and project indicia describing each said project;
  generating to a servers list and a projects list markup language representations from said host catalog database of entries for said specified member;
  generating from said servers list and said projects list a combined list in markup language representation conforming to an object model; and
  processing said combined list into a presentation format for display at a user terminal.

12. The method of claim 11, further comprising:
  generating from said host catalog database a sorted list of member names such that places belonging to a specified member are grouped together; and
  generating said servers list and said projects list from said sorted list.

13. The method of claim 11, further comprising:
  providing at said browser a user interface including in a project home page and in each project window table of contents a selector for user activation to request a display at said user terminal of said combined list.

14. The method of claim 11, said markup language being XML.

15. The method of claim 11,
  said project server indicia including project server is master indicia and project server is virtual indicia;

and further comprising:

executing simple aggregation by operating a project server which is a master server to access said catalog server selectively for immediate update and scheduled update of said catalog; and executing complex aggregation by operating a project server in a cluster of servers to access said catalog server selectively to send immediate updates to a master entry in said host catalog database for a master server in said cluster and non-immediate updates to an entry in said host catalog database for said project server.

16. The method of claim 15, at least one said project being implemented as a cluster including a master server and a plurality of project servers and project databases.

17. The method of claim 16, further comprising:

for scheduled update complex aggregation, merging entries in said host catalog database from virtual master entries for a cluster to entries for project servers in said cluster.

18. The method of claim 11, further comprising implementing each said catalog entry as a notes document.

19. The method of claim 11, further comprising implementing said host catalog database as a plurality of catalog databases servicing separate areas of an enterprise.

20. The method of claim 11, further comprising configuring said host catalog database to include a project server view for each project server in an enterprise and including project server name, project server is master, project server is virtual, project server access protocol, project server access port, project server access url prefix, and project server cluster name indicia.

21. The method of claim 11, further comprising configuring said host catalog database to include a project by member view for each project in said enterprise and including project name, project title, project server name, project server is master, project server is virtual, project managers, project authors, project readers, project size, plase last accessed, project last modified, and project is locked indicia.

22. The method of claim 15, further comprising executing as immediate updates changes including project create, project remove, project lock, change access, and change title.

23. The method of claim 22, further comprising executing as scheduled updates changes including last modified, size, and last accessed.

* * * * *

UNITED STATES PATENT AND TRADEMARK OFFICE
CERTIFICATE OF CORRECTION

PATENT NO. : 6,904,439 B2
DATED : June 7, 2005
INVENTOR(S) : Raymond T. Tang et al.

It is certified that error appears in the above-identified patent and that said Letters Patent is hereby corrected as shown below:

<u>Title page,</u>
Item [75], Inventors, "Sami M. Shalbi" should be -- Sami M. Shalabi --.

Signed and Sealed this

Eighteenth Day of October, 2005

JON W. DUDAS
*Director of the United States Patent and Trademark Office*